United States Patent [19]

Maroti et al.

[11] Patent Number: 4,577,550
[45] Date of Patent: Mar. 25, 1986

[54] TOASTER

[75] Inventors: Steven Maroti; Daniel Formosa, both of Ft. Lee, N.J.

[73] Assignee: Hickory Industries, Inc., Long Island City, N.Y.

[21] Appl. No.: 686,011

[22] Filed: Dec. 24, 1984

[51] Int. Cl.⁴ ............................................. A47J 37/08
[52] U.S. Cl. ................................ 99/329 RT; 99/334; 99/391
[58] Field of Search .................. 99/329 RT, 385, 387, 99/389, 393, 391, 334

[56] References Cited

U.S. PATENT DOCUMENTS 1,852,398  4/1932  Bersted .
2,414,139  1/1947  Cherry ............................... 99/334
2,644,392  7/1953  Foster .
3,670,642  6/1972  Bergman .
4,098,178  7/1978  Lalancette .
4,454,803  6/1984  Wolf et al. .

Primary Examiner—Billy J. Wilhite
Attorney, Agent, or Firm—McAulay, Fields, Fisher, Goldstein & Nissen

[57] ABSTRACT

A gravity fed toaster, particularly for restaurant or other commercial use, is described where bread slices to be toasted are fed by gravity and means are provided to simultaneously release a toasted slice of bread, while preventing feed of a subsequent slice from a gravity magazine.

4 Claims, 4 Drawing Figures

TOASTER

BACKGROUND OF THE INVENTION

In commercial food establishments, such as restaurants and coffee shops, the toasting of bread is a major operation. The use of the same type of toaster as is used in the home, which produces two or perhaps four slices of toasted bread in a single operation, with manual feed required for each toasting operation, is uneconomic.

As a consequence of the above, various types of commercial toasters have been developed. As a general rule, these toasters involve the use of an endless belt onto which the slices of bread to be toasted are placed, the endless belt passing between some type of heating element, and eventually discharging a slice of toasted bread. This type of equipment, too, has presented problems in such establishments.

If the endless belt type of toaster is operated continuously, then, particularly in non-peak hours, an unusable supply of toast is produced, requiring disposal of large quantities of food, or reheating of already made toast, generally resulting in an unacceptable product. On the other hand, if bread to be toasted is placed on the continuous belt type of machine only when one or more slices of toast are needed, than an inordinate delay results in obtaining the toasted bread, because such machines are not adapted to rapid production of individual slices of toast. Further, obviously, because of the length of the endless belt, and the time required for the heating elements to be warmed up, a plurality of heating elements are generally left on continuously, resulting in a waste of power, and further lack of economy.

Gravity fed toasters for toasting one or more slices of bread, and then allowing the toast to fall from the toaster mechanism upon completion of the toasting operation are known in the art. Various means to control the length of the toasting cycle are also well known, such as color sensing, heat sensing, timing, etc., and any or all of these types of sensing of completion of a toasting operating can be employed with these gravity fed toasting mechanisms, as well as with other types of toasters. For example, in each of U.S. Pat. Nos. Bersted: 1,852,398, Foster: 2,644,392, Bergman; 3,670,642, Lalancette: 4,098,178, and Wolf et al, 4,454,803, one or more pieces of bread are placed into a vertical slot which leads to the compartment where the bread slices are surrounded by heat producing elements to accomplish the toasting operation. One or more means are disclosed in each of these patents for holding the bread slices in place during the toasting operation. Among the means described in these patents are fingers, pivoted traps, forks, doors, etc., all placed at the bottom of the toasting compartment to hold the slices of bread in place until the toasting operation is completed. These means are then moved out of the way, and the toasted bread slice allowed to fall, by gravity, generally to some type of storage collector.

None of the patents just referred to, however, describe any means for a continuous feed of bread slices to be toasted, so as to make them adaptable for use in a commercial establishment, such as a restaurant. While magazine type feeds are shown, for example, in Fokakis U.S. Pat. No. 2,714,348, and Macchi U.S. Pat. No. 4,226,176, these magazine type feeds are not such as would allow for continuous, or semi-continuous, feeding of the bread slices by gravity.

Thus, the prior art does not show a toaster mechanism which allows for rapid production of one or more slices of toast, without an uneconomic build-up of toasted slices, while at the same time allowing for continuous toasting of bread slices, when such continuous operation is desirable.

SUMMARY OF THE INVENTION

In accordance with the present invention, a toaster, particularly for use in commercial restaurant establishments, has been developed which provides for toasting of bread slices, on an individual basis, a holding member to hold the bread slices being toasted during the toasting operation, to release those slices on completion of the toasting operation, and, simultaneously on release of a completed slice of toast, to hold a subsequent slice of bread to be toasted, all of the operation being carried out with a gravity feed and gravity discharge. In particular, as a holding member, a piece of sheetmetal or wireform is provided having a lower lip to hold a slice of bread being toasted, said piece of sheetmetal or said wireform being provided, at an end opposite a pivot point, with a further bent section, said further bent section acting to restrain a second slice of bread from being gravity fed to the toasting area during discharge of the first slice, reverse pivoting of the sheetmetal or wireform member allowing the second slice to drop into the toasting area. Discharge of the first, toasted slice is accomplished by a gravity discharge, and feed of second, and subsequent slices, is also accomplished by gravity.

DESCRIPTION OF THE PREFERRED EMBODIMENTS

Figure 1:
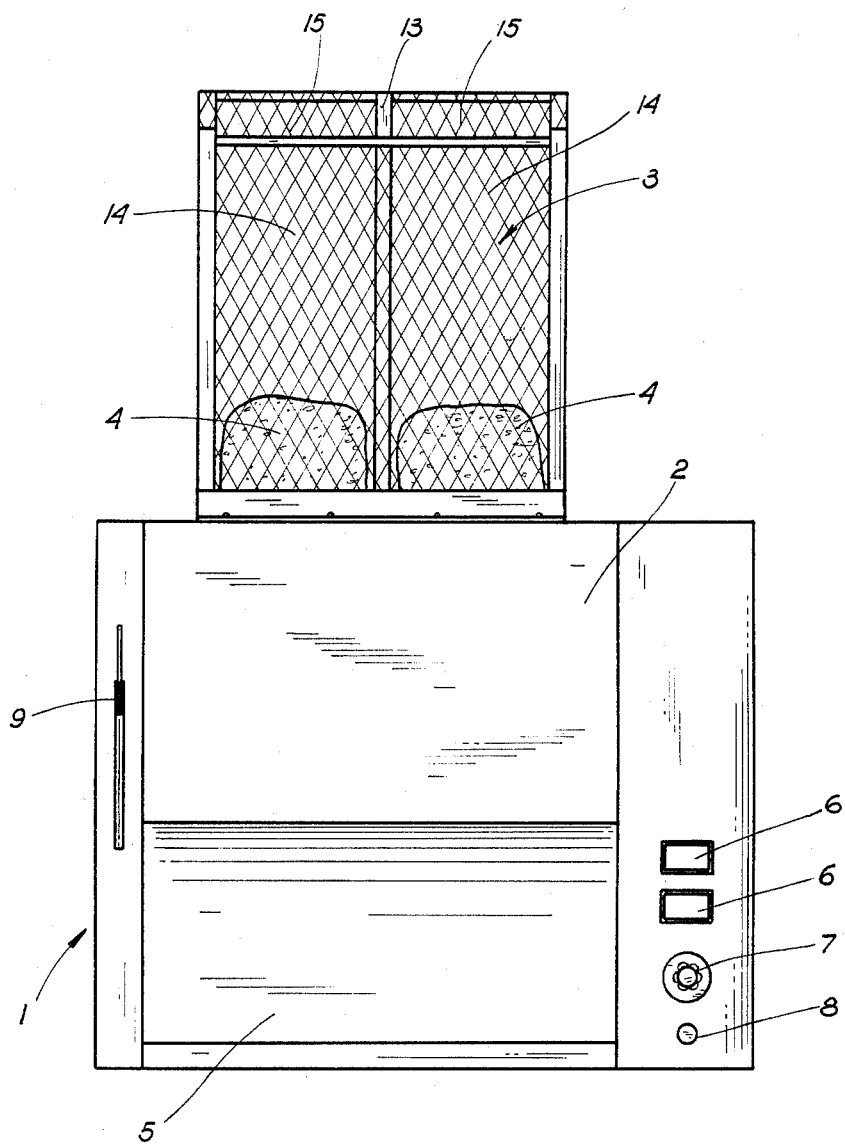
FIG. 1 is a front, plan view of a toaster for a commercial establishment, in accordance with the present invention, showing a gravity feed apparatus for delivery of slices of bread for toasting to the apparatus.

Referring to the accompanying drawings, and particularly FIG. 1, a commercial toaster apparatus 1 is illustrated as having a cabinet 2 within which is located the operative components of the commercial toaster. Located above the cabinet 2 is a gravity feed mechanism 3 to feed slices of bread 4 to the toasting chamber. As illustrated, the gravity feed mechanism feeds two slices of bread 4 to the toasting chamber, though, as will be understood, the toaster 1 can be constructed to provide for gravity feed of a single slice on each operation, or for a multiple of slices, more than two, on each operation.

The cabinet 2 includes a chute 5 into which the toasted bread slices are fed, after completion of the toasting operation. It can also include various control members for the toaster 1, including, without limitation, on-off switches 6, which can control the toasting elements, motor drives, and similar devices, a rheostat or SCR 7, to control the darkness of the toast slice, and an on-off switch 8, for actuation of the entire unit. Additionally, it can contain a manual operating member 9, to discharge the slices of bread, or toast, from the toaster 1 prior to actuation of some automatic device which would sense completion of the toasting operation. It will be understood that these control devices do not form part of the present invention, and are merely illustrative. Some or all of these control devices can be eliminated, and other control devices can be incorporated into the mechanism without departing from the present invention.

Figure 2:
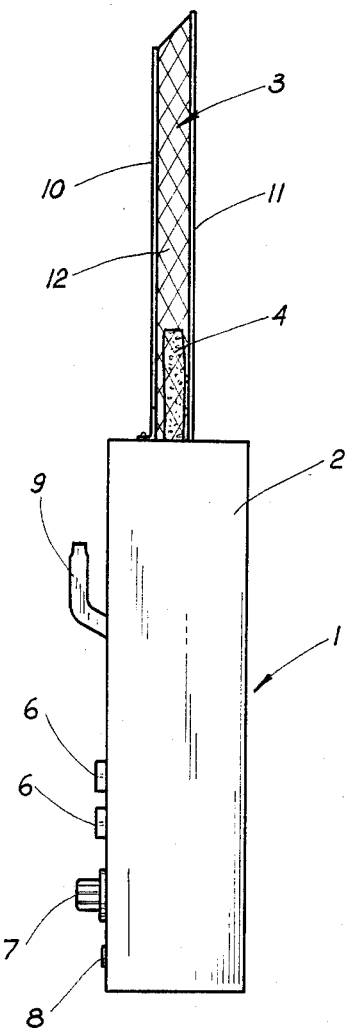
FIG. 2 is a side elevational view of the apparatus of FIG. 1.

As illustrated in FIGS. 1 and 2, the gravity feed device for slices of bread to be toasted includes front and rear mesh members 10 and 11 and a side mesh member 12, all merely to define an overall, rectangular enclosure. Located centrally, so as to space one slice of bread from another in a multi-slice feeder, is a wall member 13. This wall member provides two slots 14, each to accommodate a row of single slices of bread 4. The top of each slot is open, as illustrated at 15, in order to provide for feeding of the individual slices.

Figure 3:
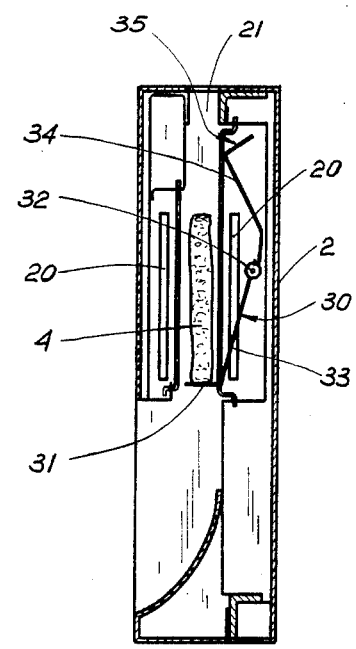
FIG. 3 is a sectional view of the apparatus shown in FIG. 2, a holding member being placed in a first position for retaining bread slices to be toasted within a toasting chamber.
Figure 4:
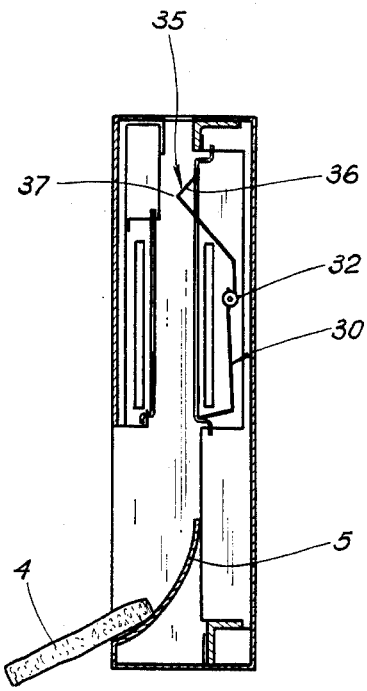
FIG. 4 is a sectional view similar to FIG. 3 showing the first bread slice, having been toasted, in a discharge position, with the holding member in a second position.

The operation of the device of the present invention is more clearly illustrated in FIGS. 3 and 4, where the cabinet 2 is shown incorporating toaster elements 20. The particular construction or configuration of the toaster elements 20 is not a critical feature of the present invention. They can be a standard resistance wire, a more modern construction, such as a high intensity heater of the type described as a heater board with fiberglass over wire, or any other device which will accomplish toasting of a slice of bread. A slot 21 is provided in the body 2 through which the slice of bread, such as 4, is fed from the gravity feed device 3 to accomplish toasting of the bread slice.

Also found within the body 2 is a holding member 30, which may be formed of sheetmetal, wireform, or any suitable material to accomplish the purpose to be described. There may be one of these holding means 30 for each of the slots 14, as shown in FIG. 1, or there may be a single holding means 30 which operates to hold the bread slices in each of the slots 21 being fed from each of the slots 14.

As shown in FIG. 3, the holding means 30 is a bent member having a first shoulder 31 on which a slice of bread to be toasted is held between the toasting elements 20. The bent means 30 can be a piece of bent sheetmetal, a bent wire form, or other suitable construction.

The holding means 30 is pivoted, as at 32, to an axis and, while the shoulder 31 is attached to portion 33, which extends downwardly from the axis, a further portion 34 extends upwardly from the axis. Attached, at the upper extremity of portion 34, is a part 35, which is at, essentially, a right angle to the portion 34.

When toasting of the bread slice 4, held between toasting elements 20, is completed, the holding means 30 is pivoted around the axis 32, as best illustrated in FIG. 4. The method of determining the termination of the toasting operation does not form a part of the present invention. It can be accomplished by means well known in the art, such as by sensing of the color of the bread slice, by thermostatic or other means which sense a change in temperature, by a timer, etc. Whatever manner is employed for sensing, a mechanism is actuated when the termination of the toasting cycle is reached. This mechanism causes the holding means 30 to be pivoted counterclockwise about the pivot 32 to the position shown in FIG. 4. This rotation of the holding means 30 removes the shoulder 31 from beneath the bread slice 4, and allow the now toasted bread slice to fall through the chute 5 and be delivered to the front of the cabinet 2.

At the same time that the counterclockwise pivoting of the holding means 30 allows the bread slice 4 to drop into the chute 5, the upper part 35 of the holding means 30 is placed within the slot 21. In this position, the member 35, based either on the flat surface 36 or the pointed area 37, at the bend of the member 35, bears against a bread slice which has previously rested on the slice 4 being toasted. When the slice 4 is permitted to drop, the slice which had previously rested above it in the slot 14 is held above the toasting chamber.

After the toasted bread slice 4 has fallen into the chute, the mechanism which moved the holding means 30 counterclockwise about the pivot 32 causes it to return, in a clockwise direction, to the position occupied in FIG. 3. In this position, the part 35, whether because of the flat surface 36 or the point 37, no longer acts against the piece of bread which had previously rested above the slice 4 being toasted, and the new slice is permitted to drop into the toasting chamber between toasting elements 20. The shoulder 31 is now in position at the bottom of that toaster chamber and catches the new slice being fed, by gravity, to the toasting chamber. The cycle is now repeated, the new slice being toasted, and actuating means causing pivoting of the holding means 30, the new slice being dropped into the chute 5, and a new slice being restrained during dropping of this toasted slice 4.

Obviously, the number of slices of bread which can be retained in the slots 14 for gravity feed into the toasting area is limited only by the height of the member 3 and operation can be continuous.

It will also be appreciated that the toasting elements 20 are relatively small in size, having, essentially, the same cross-sectional area as a slice of bread to be toasted. Thus, if the eating establishment is not running at peak rate, slices of bread need not be fed continuously to the toasting area. In such a situation, because of the small cross-sectional area of the toasting elements 20, heating is relatively rapid, and one or two slices of bread can quickly be toasted in the apparatus of the present invention. If desired, under these conditions, the automatic means for actuating holding means 30 need not be put into operation, but, on completion of the toasting cycle, the manual means 9 for rotating holding means 30 counterclockwise about its axis 32 can be actuated to release the one or two slices of bread being toasted between the toasting elements 20, and the apparatus 1 otherwise turned off.

On the other hand, if the device is operating under peak demand, slices of bread 4 can continuously be fed into the slots 14 through the openings 15 and slices of bread 4 continuously fed between the toasting elements 20, for toasting of additional bread slices when toasting of the first slices is completed, sensed by whatever sensing means is provided, and the holding means 30 pivoted, first counterclockwise, and then clockwise, about the axis 32.

In accordance with the present invention, an apparatus has been described which allows for continuous operation, based only on a gravity feed, of a toaster for bread slices where toasting of a subsequent piece of bread begins, immediately, after a sensed termination of the toasting operation for a first slice. Based upon the configuration of the device, it can be equally well employed for a single toasting operation, when continuous toasting is not desired, without loss of speed or economy.

The invention should not be considered as limited by the specific embodiments shown and described, but only as limited in the appended claims.

What is claimed is:

1. A toaster apparatus including:
   a. at least two toaster elements defining a chamber in which a slice of bread is held to be toasted;
   b. gravity means for feeding additional slices of bread to said chamber above said slice of bread being toasted;
   c. a holding means adapted to be pivoted about an axis, said holding means being provided, on one side of said axis, with a portion to retain said bread in said chamber, between said toaster elements, during a toasting operation, and a portion on the opposite side of said axis to restrain a piece of bread above said bread held within said chamber from dropping, by gravity, through a slot into said toasting chamber;
   d. pivot means for said holding means; and
   e. means to rotate said holding means about said pivot means upon completion of a toasting operation to release said piece of bread being toasted and to restrain a piece of bread above that from dropping into said toasting chamber.

2. The apparatus of claim 1 having, in addition, means to sense the termination of a toasting operation, said means actuating said means for rotating said holding means.

3. The apparatus of claim 1 wherein said means for gravity feed of said bread to be toasted is a rectangular enclosure placed above said apparatus.

4. The apparatus of claim 3 wherein at least two rectangular enclosures are provided for parallel feed of two slices of bread.

* * * * *